(12) United States Patent
Ji

(10) Patent No.: US 8,953,293 B2
(45) Date of Patent: Feb. 10, 2015

(54) BATTERY PROTECTION CIRCUIT

(71) Applicant: Se-Jin Ji, Yongin-si (KR)

(72) Inventor: Se-Jin Ji, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 35 days.

(21) Appl. No.: 13/673,077

(22) Filed: Nov. 9, 2012

(65) Prior Publication Data
US 2013/0163134 A1 Jun. 27, 2013

Related U.S. Application Data

(60) Provisional application No. 61/580,587, filed on Dec. 27, 2011.

(51) Int. Cl.
H02H 3/027 (2006.01)
H02J 7/00 (2006.01)

(52) U.S. Cl.
CPC ............. *H02J 7/0031* (2013.01); *H02J 7/0026* (2013.01)
USPC ......................................... 361/91.1; 361/91.3

(58) Field of Classification Search
USPC ................................. 361/91.1, 91.3
See application file for complete search history.

(56) References Cited

U.S. PATENT DOCUMENTS 6,208,117 B1 * 3/2001 Hibi ............................... 320/134
8,659,267 B2 * 2/2014 Yun ............................... 320/134
2005/0242779 A1 * 11/2005 Yoshio .......................... 320/134
2007/0159138 A1 7/2007 Furuuchi et al.
2008/0074082 A1 3/2008 Tae et al.
2009/0202890 A1 8/2009 Takeda et al.
2010/0141219 A1 * 6/2010 Li .................................. 320/162
2010/0214707 A1 8/2010 Yun

FOREIGN PATENT DOCUMENTS

| JP | 2005-160169 A | 6/2005 |
| JP | 2006-109596 A | 4/2006 |
| KR | 2003-0081934 A | 10/2003 |
| KR | 2006-0062368 A | 6/2006 |

(Continued)

OTHER PUBLICATIONS

Korean Office Action dated Aug. 29, 2013 for Korean Patent Apptication No. KR 10-2012-0095004 which claims priority from U.S. Appl. No. 61/580,587, filed Dec. 27, 2011; and captioned U.S. Appl. No. 13/673,077.

(Continued)

*Primary Examiner* — Danny Nguyen
(74) *Attorney, Agent, or Firm* — Knobbe, Martens, Olson & Bear, LLP

(57) ABSTRACT

A battery pack including a battery and a battery protection circuit is disclosed. In one aspect, the battery protection circuit comprises a protective device configured to inhibit a flow of current between an electrode of the circuit and the battery when activated. The battery protection circuit further comprises a primary protection circuit and a secondary protection circuit. The primary protection circuit is configured to generate a control signal for control the protective device when detecting an abnormal voltage in a unit cell of the battery. The secondary protection circuit is configured to activate the protective device, either when receiving the control signal from the primary protection circuit or when detecting an abnormal voltage in a unit cell of the battery.

7 Claims, 4 Drawing Sheets

(56) References Cited

FOREIGN PATENT DOCUMENTS

| | | |
|---|---|---|
| KR | 10-0863956 B1 | 10/2008 |
| KR | 10-2009-0087400 A | 8/2009 |
| KR | 10-0962497 B1 | 6/2010 |
| KR | 2010-0096391 A | 9/2010 |

OTHER PUBLICATIONS

Korean Notice of Allowance dated Aug. 22, 2014 for Korean Patent Application No. KR 10-2012-0095004, which shares priority of U.S. Appl. No. 61/580,587, filed Dec. 27, 2011, with captioned U.S. Appl. No. 13/673,077.

* cited by examiner

BATTERY PROTECTION CIRCUIT

This application claims the benefit of priority of U.S. Provisional Application No. 61/580,587, filed on Dec. 27, 2011, entitled "BATTERY PROTECTION CIRCUIT", the entire contents of which are incorporated by reference.

BACKGROUND

1. Field

One or more embodiments of the present disclosure relate to a battery protection circuit.

2. Description of the Related Art

Portable electronic devices, for example, mobile phones, digital cameras, and laptop computers, are being widely distributed. Accordingly, improved batteries for supplying electric power to operate portable electronic devices are being actively developed.

A battery is provided as a battery pack with a protection circuit that controls charging/discharging of the battery. In the battery pack, defects may occur in the battery or the protection circuit during a charging or discharging process, and thus the protection circuit includes various tools for stably controlling the charging and discharging of the battery.

SUMMARY

One or more embodiments of the present disclosure include a battery protection circuit capable of simplifying a structure of a battery circuit and reducing material costs. In an embodiment, a battery protection circuit includes a control circuit in a secondary protection circuit that controls a protective device (e.g., a fuse). The control circuit activates the protective device in order to permanently block flow of a charging current and a discharging current.

According to embodiments of the present disclosure, a control circuit is included in the secondary protection circuit, thereby simplifying the structure of the battery protection circuit and reducing material costs.

In an embodiment, a battery protection circuit for a rechargeable battery is provided. The battery protection circuit may comprise a protective device configured to inhibit a flow of charging current into a rechargeable battery or a flow of discharging current out of the rechargeable battery when activated. The battery protection circuit may further comprise a first protection circuit in electrical communication with the rechargeable battery. The rechargeable battery may comprise one or more battery cells. The first protection circuit may be configured to output a protection signal in response to measuring an abnormality in the one or more battery cells. The battery protection circuit may additionally comprise a second protection circuit in electrical communication with the rechargeable battery, the first protection circuit, and the protective device. The second protection circuit may also comprise a protective device control switch, where the second protection circuit is configured to activate the protective device employing the protective device control switch in response to receiving the protection signal from the first protection circuit or measuring an abnormality in the rechargeable battery.

The second protection circuit may be further configured to activate the protective device after a selected period of time from measurement of the abnormality by the second protection circuit.

The first protection circuit may be further configured to monitor one or more of a charge state of the rechargeable battery during charge or discharge of the battery and one or more electric currents flowing in the battery.

The first protection circuit may provide a control signal for control of the charge state of the rechargeable battery after measurement of the abnormality by the first protection circuit.

The battery protection circuit may further comprise a control switch configured to control the flow of charging current or the flow of discharging current based upon the control signal received from the first protection circuit.

The first protection circuit may provide a control signal for control of the charge state of the rechargeable battery based upon the monitoring performed by the first protection circuit.

The abnormalities measured by the first and second protection circuits may be substantially the same.

The second protection circuit may comprise a comparer configured to compare one or more measured voltages of the rechargeable battery with corresponding reference voltages to determine the presence of a voltage abnormality in the measured voltages. The comparer may further output a result signal when a voltage abnormality is detected. The second protection circuit may further comprise a delay unit configured to delay transmission of the result signal for a selected duration of time. The second protection circuit may also comprise a logic unit configured to receive the result signal and the protection signal. The logic unit may be further configured to generate a control signal for activation of the protective device by the protective device control switch when at least one of the result signal and protection signal are received.

The protective device may comprise a fuse.

In a further embodiment, a battery pack is provided. The battery pack may comprise a battery including one or more battery cells. the battery pack may additionally comprise a battery protection circuit including a first integrated circuit (IC) and a protective device. The first IC may comprise a voltage detection terminal and a protective device control terminal. The first IC may further comprise a protective device control switch.

The battery pack may also comprise a second IC. The second IC may comprise a terminal for receiving a fuse control signal.

DETAILED DESCRIPTION

Figure 1:
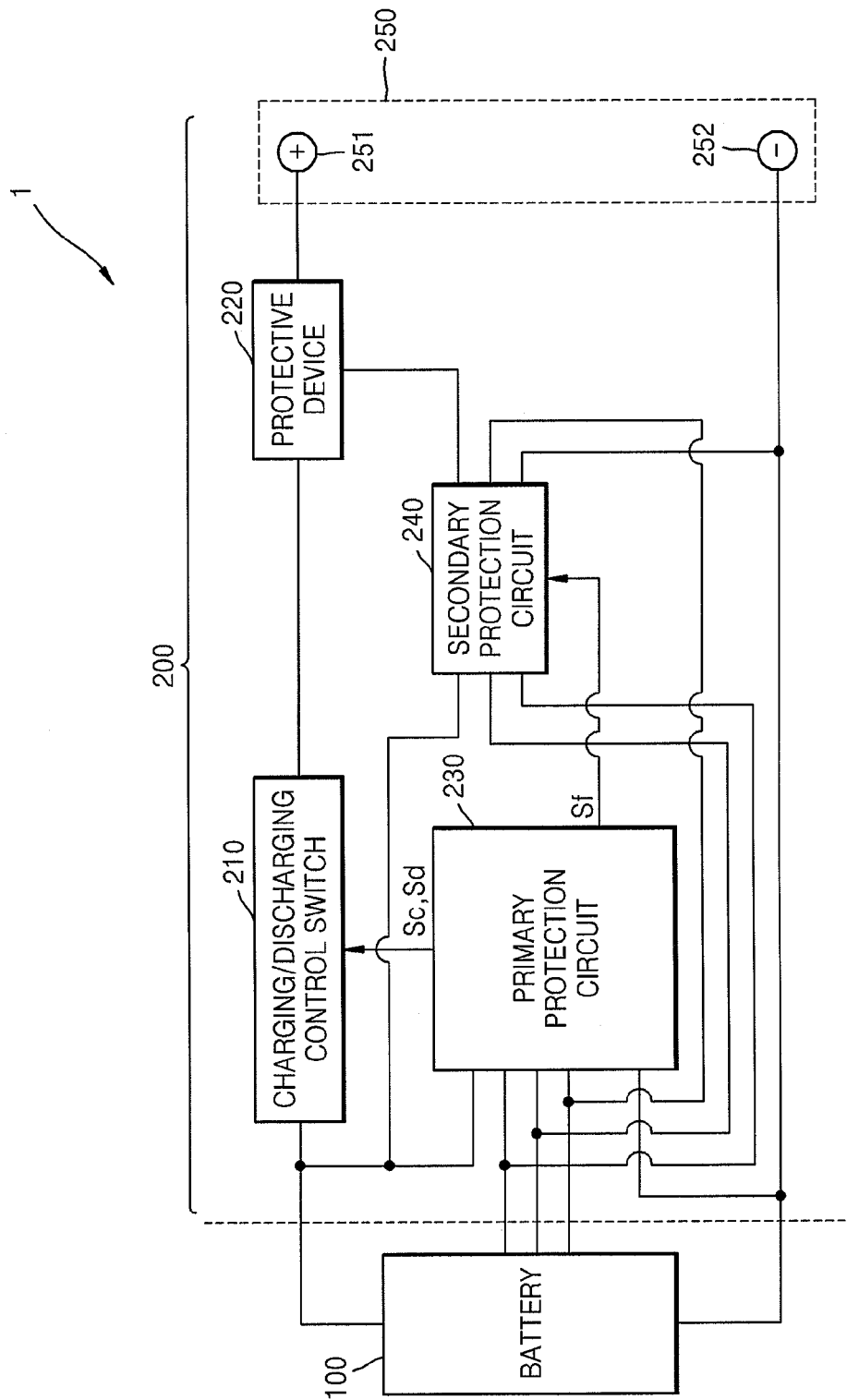
FIG. 1 is a diagram showing a structure of a battery pack including a battery protection circuit according to an embodiment of the present disclosure.

As the disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes to the disclosed embodiments are encompassed in the present disclosure.

While such terms as "first," "second," etc., may be used to describe various components, such components may not be limited to the above terms. The above terms may be used only to distinguish one component from another.

The terms used in the present specification are merely used to describe particular embodiments and are not intended to limit the present disclosure. An expression used in the singular encompasses the expression of the plural, unless it has a clearly different meaning in the context. In the present specification, it may be understood that the terms such as "including" or "having," etc., may indicate the existence of the features, numbers, steps, actions, components, parts, and combinations thereof disclosed in the specification, and may not preclude the possibility that one or more other features, numbers, steps, actions, components, parts, and combinations thereof may exist or may be added.

Embodiments of the present disclosure may be described below in more detail with reference to the accompanying drawings. Those components that are the same or are in correspondence may be rendered the same reference numeral regardless of the figure number and redundant explanations may be omitted.

FIG. 1 is a diagram showing a structure of a battery pack 1 including a battery protection circuit 200 according to an embodiment of the present disclosure in electrical communication with a battery 100.

Referring to FIG. 1, the battery pack 1 includes a battery 100 and the battery protection circuit 200. Here, the battery protection circuit 200 includes a charging/discharging control switch 210, a protective device 220, a primary protection circuit 230, a secondary protection circuit 240, and a terminal unit 250. It will be understood that, while the above referenced components are illustrated as separate components, one or more of these components may be combined into a single component or unit (e.g., a one or more integrated circuits).

The battery 100 stores electric power to supply stored electric power to an electronic device in which the battery pack 1 is mounted. In addition, when a charger is connected to the battery pack 1, the battery 100 may be charged by external electric power.

The battery protection circuit 200 controls charging and discharging of the battery 100 and controls overall operations of the battery pack 1.

The charging/discharging control switch 210 is formed on a large current path through which a charging current and a discharging current flow and control the flows of the charging current and the discharging current.

The protective device 220 blocks the large current path (e.g., be positioned on the current path) and be configured to permanently block the flows of the charging current and the discharging current when activated. The protective device 220 may be a secondary protective unit that operates when an abnormal state of the battery pack 1 is continued even though a charging or discharging operation is blocked by controlling the charging/discharging control switch 210. In certain embodiments, the protective device 220 may comprise a fuse.

The primary protection circuit 230 controls the charging and discharging of the battery 100 and control balancing of a battery cell 110 included in the battery 100. The primary protection circuit 230 monitor one or more of a charging state of the battery 100, a discharging state of the battery 100 and an electric current flowing state in the battery pack 1. In addition, the primary protection circuit 230 measures voltages of one or more of the battery cells 110 and control operations of the protective device 220 when an abnormal voltage of one or more of the battery cells 110 is sensed. The primary protection circuit 230 controls one or more of cell balancing of the battery cells 110 charging of the battery 100, and discharging of the battery 100 according to one or more of the monitoring result and the measuring result.

In an embodiment, the primary protection circuit 230 generates a charging control signal Sc and a discharging control signal Sd for measuring the voltages of the battery cells 110 and for controlling the charging/discharging control switch 210. The primary protection circuit 230 further generates a fuse control signal Sf for controlling the protective device 220.

The secondary protection circuit 240 measure the voltages of the battery cells 110 to determine whether one or more of the battery cells 110 is operating abnormally. As a result of measuring the voltages of the battery cells 110, if there is an abnormality detected in the battery cells 110 or if the fuse control signal Sf is transmitted from the primary protection circuit 230, the secondary protection circuit 240 induces an electric current in the protective device 220 to activate the protective device 220. In this manner, an over-current may be prevented from flowing in the battery cells 110.

The terminal unit 250 connects the battery pack 1 to an external device. For example, in an embodiment, the external device may comprise an electronic device or a charger. The terminal unit 250 includes a cathode terminal 251 and an anode terminal 252. The charging electric current is induced through the cathode terminal 251 and the discharging current exits through the cathode terminal 251. On the other hand, the charging current exits through the anode terminal 252, and the discharging current is induced through the anode terminal 252.

Although not shown in the drawings, in an embodiment, the terminal unit 250 may further include a terminal. The terminal unit 250 may be configured for transmitting data to the external apparatus, receiving a control signal from the external device, and combinations thereof. In addition, as illustrated in FIG. 1, the terminal unit 250 includes a pair of the cathode terminal 251 and the anode terminal 252. However, in alternative embodiments, a terminal for charging and a terminal for discharging may each be separately formed.

Hereinafter, operations of the battery protection circuit 200 will be described with reference to the detailed circuit structure of the battery pack 1.

Figure 2:
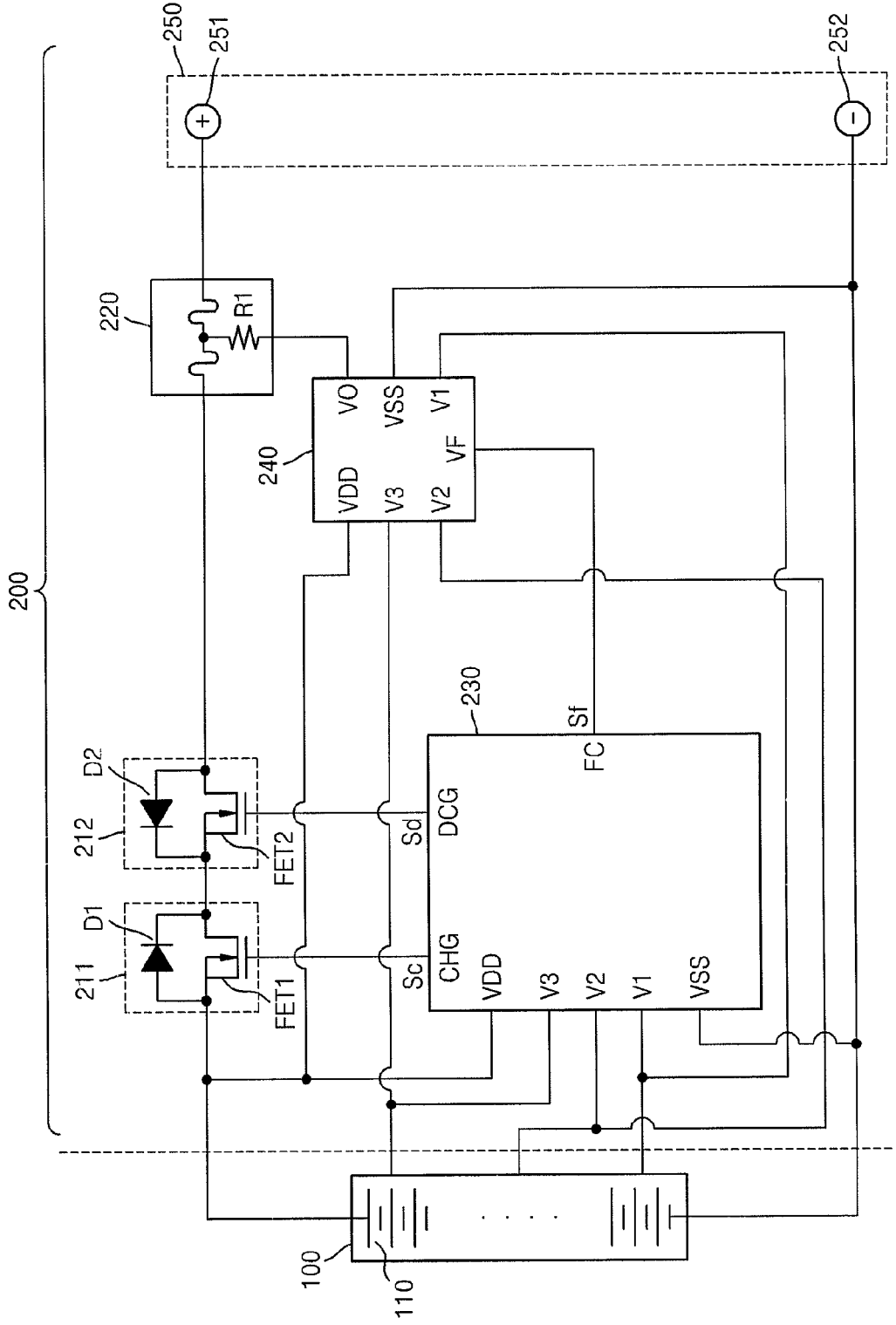
FIG. 2 is a circuit diagram showing the battery pack of FIG. 1 in more detail.

FIG. 2 is a circuit diagram showing the battery pack 1 of the embodiment of FIG. 1 in more detail.

The battery 100 may include at least one battery cell 110. The battery cell 110 may comprise a rechargeable secondary battery. Examples may include, but are not limited to, one or more of a nickel-cadmium battery, a lead secondary battery, a nickel metal hydride battery (NiMH), a lithium ion battery, and a lithium polymer battery.

The charging/discharging control switch 210 may include a charging control switch 211 and a discharging control switch 212.

The charging control switch 211 controls the flow of the charging current according to the charging control signal Sc. The charging control switch 211 includes a field effect transistor FET1 and a parasitic diode D1. The field effect transistor FET1 is connected to limit an electric current flowing from the cathode terminal 251 to the battery 100, from the battery 100 to the anode terminal 252, and combinations thereof. That is, in certain embodiments, the flow of the charging current may be blocked by using the field effect transistor FET1. For example, as illustrated in FIG. 2, the field effect transistor FET1 is arranged such that the discharging current may flow through the parasitic diode D1.

The discharging control switch 212 controls the flow of the discharging current according to the discharging control signal Sd. The discharging control switch 212 include a field effect transistor FET2 and a parasitic diode D2. The field effect transistor FET2 is connected so as to restrict an electric current flowing from the anode terminal 252 to the battery 100, from the battery 100 to the cathode terminal 251, and combinations thereof. That is, the flow of the discharging current may be blocked by using the field effect transistor FET2. For example, as illustrated in FIG. 2, the field effect transistor FET2 is arranged such that the charging current may flow through the parasitic diode D2. Connecting directions of a source electrode and a drain electrode of the field effect transistor FET2 are opposite to connecting directions of a source electrode and a drain electrode of the field effect transistor FET1.

In an embodiment, the charging control switch 211 and the discharging control switch 212 may comprise switching devices and are not limited to field effect transistors. For example, various devices that may be used as switches may be used as one or more of the charging control switch 211 and the discharging control switch 212.

The protective device 220 may be positioned on a large current path and configured to permanently block the current path upon activation of the protective device 220. As discussed in greater detail below, so configured, the protective device 200 prevents the battery pack 1 from being reused. In certain embodiments, the protective device 220 may comprise a fuse.

The protective device 220 may be formed between the charging/discharging control switch 210 and the cathode terminal 251 of the terminal unit 250 on the large current path. The protective device 220 may block flow of current along the current path between the cathode terminal 251 and the remainder of the protection circuit 200 when the battery 100 has a defect so that the charging current or the discharging current may not flow. A resistor R1 of the fuse may be connected between the large current path and a ground. When an electric current that is equal to or greater than a predetermined magnitude flows through the resistor R1, the protective device 220 (e.g., a fuse) is melted by heat generated from the resistor R1 and the flow of the electric current is blocked.

The primary protection circuit 230 may include a power source terminal VDD, a ground terminal VSS, terminals V1, V2, and V3 for measuring voltages of the battery cells 110, a charging control terminal CHG, a discharging control terminal DCG, and a first fuse control terminal FC.

A power voltage and a ground voltage may be respectively applied to the power source terminal VDD and the ground terminal VSS. A plurality of voltages of the battery cells 110 may be respectively applied to the terminals V1, V2, and V3 for measuring the voltages of the battery cells 110. The charging control terminal CHG may output the charging control signal Sc for controlling the operation of the charging control switch 211 when a defect (e.g., an abnormality) in the battery pack 1 is measured. The discharging control terminal DCG may output the discharging control signal Sd for controlling the operation of the discharging control switch 212, when a defect in the battery pack 1 is measured.

The first fuse control terminal FC may output the fuse control signal Sf for allowing the protective device 220 to activate and block the large current path. The primary protection circuit 230 may measure the voltages of the battery cells 110 and generate the fuse control signal Sf. The primary protection circuit 230 may further output the fuse control signal Sf through the first fuse control terminal FC to signal the protective device 220 to activate and block the large current path when the primary protection circuit detects an abnormality in one or more of the battery cells 110.

Although not shown in the drawing, the primary protection circuit 230 may further include terminals for measuring one or more of an intermediate voltage, monitoring the charging state and the discharging state, and measuring a flow of electric current.

In alternative embodiments, one or more of the above disclosed functions of the primary protection circuit 230 may be performed by a first integrated circuit. For example, the first integrated circuit may comprise a voltage detection terminal and a protective device control terminal. The voltage detection terminal may at least perform the functions of terminals V1, V2, V3 for measuring voltages of the battery cells 110 and detecting voltage abnormalities in the battery cells 110, as discussed above. The protective device control terminal may perform the functions of at least the fuse control terminal FC for output of a fuse control signal $S_f$, as discussed above.

The secondary protection circuit 240 may include a power source terminal VDD, a ground terminal VSS, terminals V1, V2, and V3 for measuring the voltages of the battery cells 110, a fuse control signal Sf receiving terminal VF, and a second fuse control terminal VO.

A power voltage and a ground voltage may be respectively applied to the power source terminal VDD and the ground terminal VSS. A plurality of voltages of the battery cells 110 may be respectively applied to the terminals V1, V2, and V3 for measuring the voltages of the battery cells 110. The fuse control signal receiving terminal VF may receive the fuse control signal Sf output from the primary protection circuit 230. The second fuse control terminal VO may induce an electric current to flow through the resistor R1 of the protective device 220, when a result of measuring the voltages of the battery cells 110 indicates that an abnormality has occurred in the battery cells 110 or when the fuse control signal Sf output from the primary protection circuit 230 is received.

Figure 3:
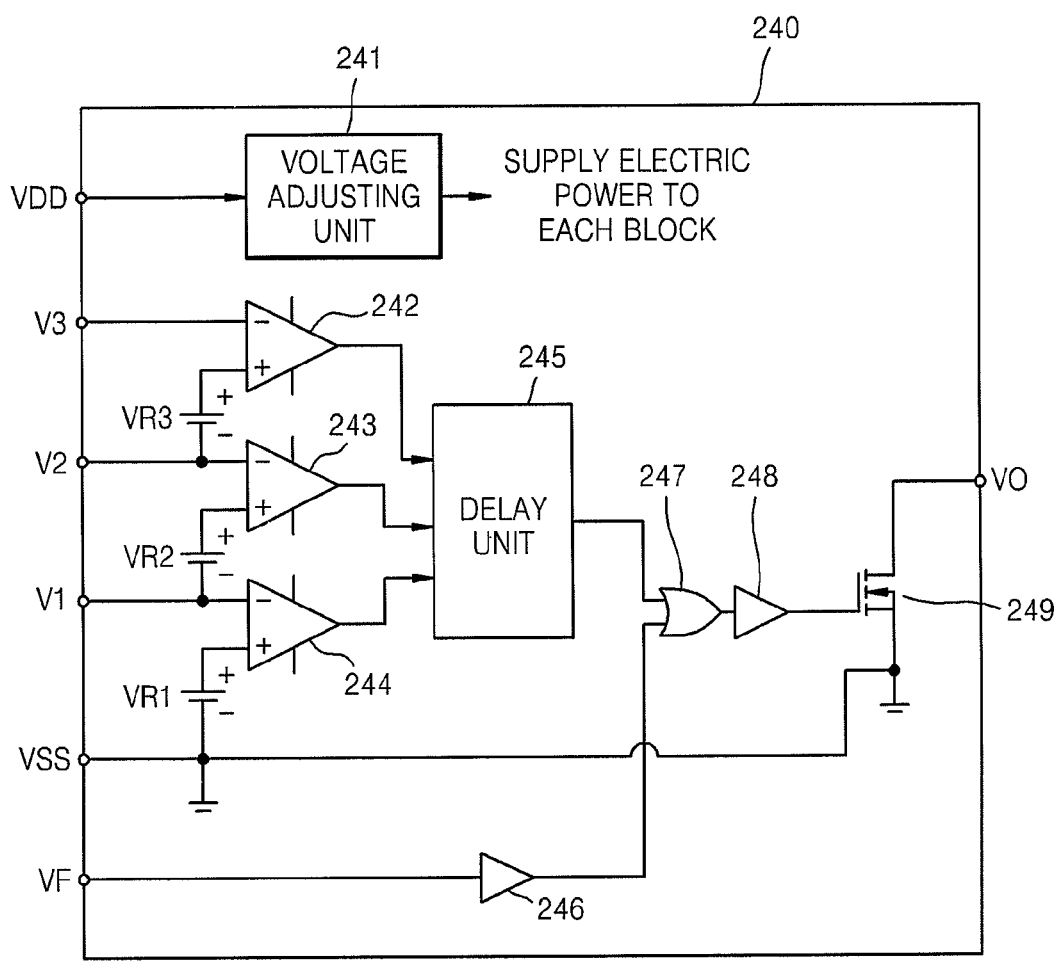
FIG. 3 is a circuit diagram showing a secondary protection circuit of FIG. 1.

FIG. 3 is a detailed circuit diagram of an embodiment of the secondary protection circuit 240.

Referring to FIG. 3, the secondary protection circuit 240 may include a voltage adjusting unit 241, first through third comparing units 242, 243, and 244, a delay unit 245, a first amplification unit 246, a logic sum calculation unit 247, a second amplification unit 248, and a control unit 249.

The voltage adjusting unit 241 may adjust electric power input through the power source terminal VDD in order to generate voltages for operating each of elements in the secondary protection circuit 240.

The first through third comparing units 242, 243, and 244 may respectively compare the voltages of the battery cells 110 input into the voltage measuring terminals V1, V2, and V3 with first through third reference voltages VR1, VR1+VR2, and VR1+VR2+VR3 to determine whether the battery cells 110 are in abnormal states or not. For example, as illustrated in the embodiment of FIG. 3, when the voltages of the battery cells 110 input into the voltage measuring terminals V1, V2, and V3 are the same as the first through third reference voltages VR1, VR1+VR2, and VR1+VR2+VR3, the first through third comparing units 242, 243, and 244 may output 0. However, when there is a difference between the voltages of the battery cells 110 input into the voltage measuring terminals V1, V2, and V3 and the first through third reference voltages VR1, VR1+VR2, and VR1+VR2+VR3, the first through third comparing units 242, 243, and 244 may determine that there is an abnormality. In response to determining that there is an abnormality, a voltage for operating the protective device 220 may be output.

The delay unit 245 delays the comparison result value of the first through third comparing units 242, 243, and 244 for a predetermined time. The predetermined time may be, for example, 4 seconds.

Thus, the operation of the secondary protection circuit 240 may be prevented during the operation of the primary protection circuit 230. For example, in certain embodiments, when the voltages of the battery cells 110 are abnormal, both the primary protection circuit 230 and the secondary protection circuit 240 may determine that the voltages of the battery cells 110 are abnormal. However, the primary protection circuit 230 may have priority. Thus the primary protection circuit 230 may generate the fuse control signal Sf and transmit the generated signal Sf to the secondary protection circuit 240. The secondary protection circuit 240, in response to receiving the generated Sf signal, may drive the control unit 249 according to the fuse control signal Sf transmitted from the primary protection circuit 230.

However, if the fuse control signal Sf is not transmitted from the primary protection circuit 230 for a predetermined time, even when the voltages of the battery cells 110 may be determined to be in the abnormal state, the secondary protection circuit 240 may operate the control unit 249 by using information about the battery cells 110 determined therein. Therefore, if there is a problem in measuring the voltages of the battery cells 110 by the primary protection circuit 230, the secondary protection circuit 240, instead of the primary protection circuit 230, may measure the voltages of the battery cells 110. Beneficially, in this manner, the battery cell 110 may be dual-protected.

The first amplification unit 246 amplifies the fuse control signal Sf input through the fuse control signal Sf receiving terminal VF from the primary protection circuit 230.

The logic sum calculation unit 247 performs the logic sum calculation of the comparison result of the voltages of the battery cells 110 output from the delay unit 245 and the fuse control signal Sf amplified by the first amplification unit 246 and output a final fuse control signal to the control unit 249. For example, in an embodiment, when the fuse control signal Sf is input from the primary protection circuit 230, or the secondary protection circuit 240 determines that an abnormal voltage occurs in the battery cells 110, a control signal for turning the control unit 249 on is applied to the control unit 249. However, when the fuse control signal Sf is not input from the primary protection circuit 230 and the secondary protection circuit 240 determines that an abnormal voltage in the battery cells 110 does not occur, a control signal for turning the control unit 249 off is applied to the control unit 249.

The second amplification unit 248 may amplify the final fuse control signal output from the logic sum calculation unit 247.

The control unit 249 may be turned on/turned off according to the amplified final fuse control signal. When the fuse control signal for turning on the control unit 249 is input into the fuse control unit 249, the control unit 249 may allow an electric current to flow through the resistor R1 included in the protective device 220 (e.g., a fuse) so that the protective device 220 may block the current pathway. The control unit 249 may include a field effect transistor FET3.

As described above, a control unit 249 may be formed on outer portion of a secondary protection circuit 240. Thus, the control unit 249 may receive a control signal from either the primary protection circuit 230 or the secondary protection circuit 240 to cause the protective device 220 to block the current path, and thus occupies a circuit area. However, in the present embodiment, the control unit 249 is included in the secondary protection circuit 240. Thus, the area occupied by the circuit 200 may be reduced.

In a further embodiment, one or more functions of the secondary protection circuit 240 is performed by a second integrated circuit (IC). For example, the second integrated circuit includes a voltage detection terminal, a terminal for receiving the fuse control signal, and a protective device control switch.

The voltage detection terminal of the second integrated circuit may be configured to perform the function of at least terminals V1, V2, and V3, the first through third comparing units 242, 243, and 244, and the delay unit 245 of the secondary protection terminal 240. The second IC is further configured to perform the function of the first through third comparing units 242, 243, 244 to determine the presence of abnormalities in the battery cells 110 based upon voltages input into the voltage detection terminal. The second IC further performs the function of the delay unit 245, delaying a comparison result value of the first through third comparing units 242, 243, and 244 for a predetermined time.

The terminal for receiving the fuse control signal is configured to perform the functionality of the receiving terminal VF, as discussed above. For example, the second IC is configured to receive a fuse control signal Sf (e.g., from a primary protection circuit 230 and/or a first integrated circuit, as described above).

The protective device control switch of the second IC may be configured to perform the function of one or more of the second fuse control terminal VO, the first amplification unit 246, the logic sum calculation unit 247, the second amplification unit 248, and the control unit 249 discussed above. For example, when either the fuse control signal Sf is received by the second IC or the second IC determines the presence of an abnormal voltage in the battery cells 110, the second IC may transmit a signal to the protective device causing the protective device 220 (e.g., a fuse) to block the current pathway. In another example, when the fuse control signal Sf is not received and the second IC determines that an abnormal voltage in the battery cells 110 does not occur, the second IC may refrain from transmitting a signal to the protective device causing the protective device 220 (e.g., a fuse) to block the current pathway.

Figure 4A:
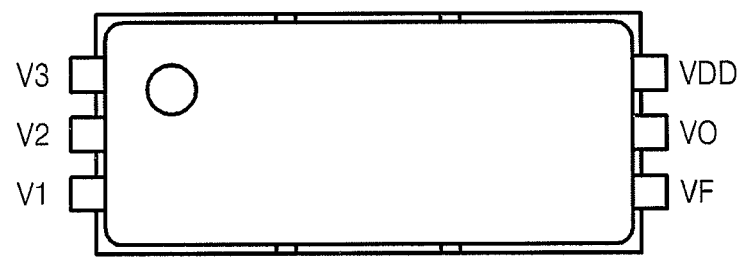
FIGS. 4A and 4B are diagrams showing embodiments of electric devices in the secondary protection circuit of FIG. 2.
Figure 4B:
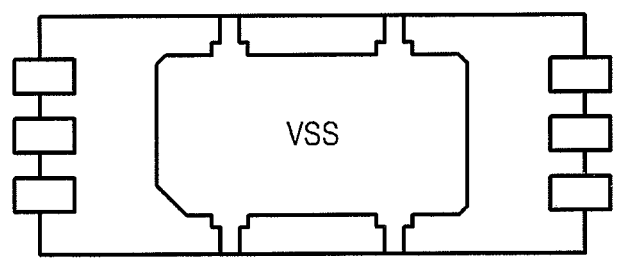

FIGS. 4A and 4B are schematic diagrams showing an electric device of an embodiment of the secondary protection circuit 240. FIG. 4A is a schematic illustration of a top view of the electric device and FIG. 4B is a schematic illustration of a bottom view of the electric device. Referring to FIG. 4B, the ground terminal VSS is formed wide, and the ground terminal VSS is used as a drain electrode of the control unit 249 including the field effect transistor FET3 so that heat loss may be reduced when an electric current flowing through the field effect transistor FET3 generates heat.

It should be understood that the embodiments described therein should be considered in a descriptive sense only and not for purposes of limitation. Descriptions of features or aspects within each embodiment should typically be considered as available for other similar features or aspects in other embodiments.

What is claimed is:

1. A battery protection circuit for a rechargeable battery, comprising:
   a protective device configured to inhibit a flow of charging current into a rechargeable battery or a flow of discharging current out of the rechargeable battery when activated;
   a first protection circuit in electrical communication with the rechargeable battery, wherein the rechargeable battery comprises one or more battery cells and wherein the first protection circuit is configured to output a protection signal in response to measuring an abnormality in the one or more battery cells; and a second protection circuit in electrical communication with the rechargeable battery, the first protection circuit, and the protective device, the second protection circuit further comprising a protective device control switch, wherein the second protection circuit is configured to activate the protective device employing the protective device control switch in response to the protection signal received from the first protection circuit or measuring an abnormality in the rechargeable battery, wherein the second protection circuit comprises:

a comparator configured to compare one or more measured voltages of the rechargeable battery with corresponding reference voltages to determine the presence of a voltage abnormality in the measured voltages and output a result signal when a voltage abnormality is detected;

a delay unit configured to delay transmission of the result signal for a selected duration of time; and a logic unit configured to receive the result signal and the protection signal and to generate a control signal for activation of the protective device by the protective device control switch when at least one of the result signal and protection signal are received.

2. The battery protection circuit of claim 1, wherein the first protection circuit is further configured to monitor one or more of:

a charge state of the rechargeable battery during charge or discharge of the battery; and one or more electric currents flowing in the battery.

3. The battery protection circuit of claim 2, wherein the first protection circuit is configured to provide a control signal to control the charge state of the rechargeable battery after the detection of the abnormality by the first protection circuit.

4. The battery protection circuit of claim 3, further comprising a control switch configured to control the flow of charging current or the flow of discharging current based upon the control signal received from the first protection circuit.

5. The battery protection circuit of claim 2, wherein the first protection circuit is configured to provide a control signal to control the charge state of the rechargeable battery based upon the monitoring performed by the first protection circuit.

6. The battery protection circuit of claim 1, wherein the protective device is a fuse.

7. A battery pack, comprising:

a battery including one or more battery cells;

a fuse;

a first battery protection circuit including a first integrated circuit (IC) and a protective device, wherein the first IC comprises a voltage detection terminal and a protective device control terminal, the first IC further comprising a protective device control switch circuit, wherein the first IC is configured to i) measure a voltage of the one or more battery cells and ii) output a fuse control signal; and a second IC comprising a terminal for receiving a fuse control signal, wherein the second IC is configured to i) compare one or more measured voltages of the rechargeable battery with corresponding reference voltages to determine the presence of a voltage abnormality in the measured voltages, ii) output a result signal when a voltage abnormality is detected, iii) delay transmission of the result signal for a selected duration of time, iv) receive the results signal and the protection signal and v) generate a control signal for activation of the protective device by the protective device control switch when at least one of the result signal and the protection signal are received.

* * * * *